Aug. 22, 1944.                    S. WEBB                    2,356,485
                         TUBULAR ARTICLE CONVEYER
                          Filed Dec. 30, 1942              2 Sheets-Sheet 2
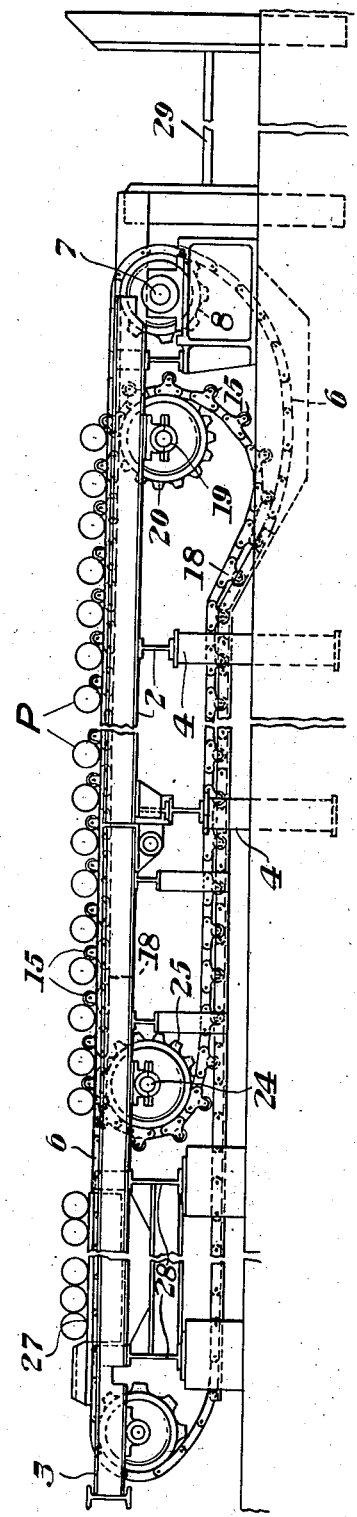
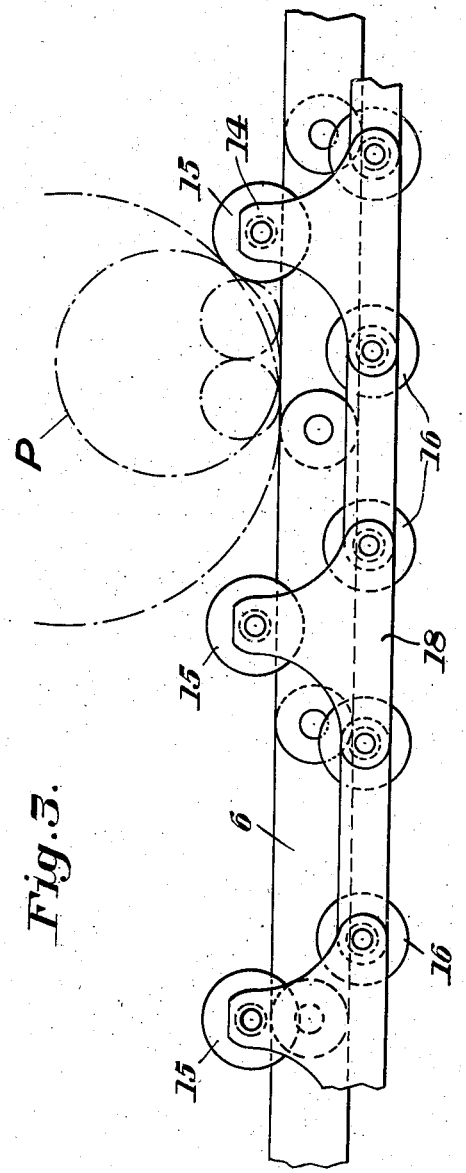
INVENTOR
SAMUEL WEBB,
by: John E. Jackson
his Attorney.

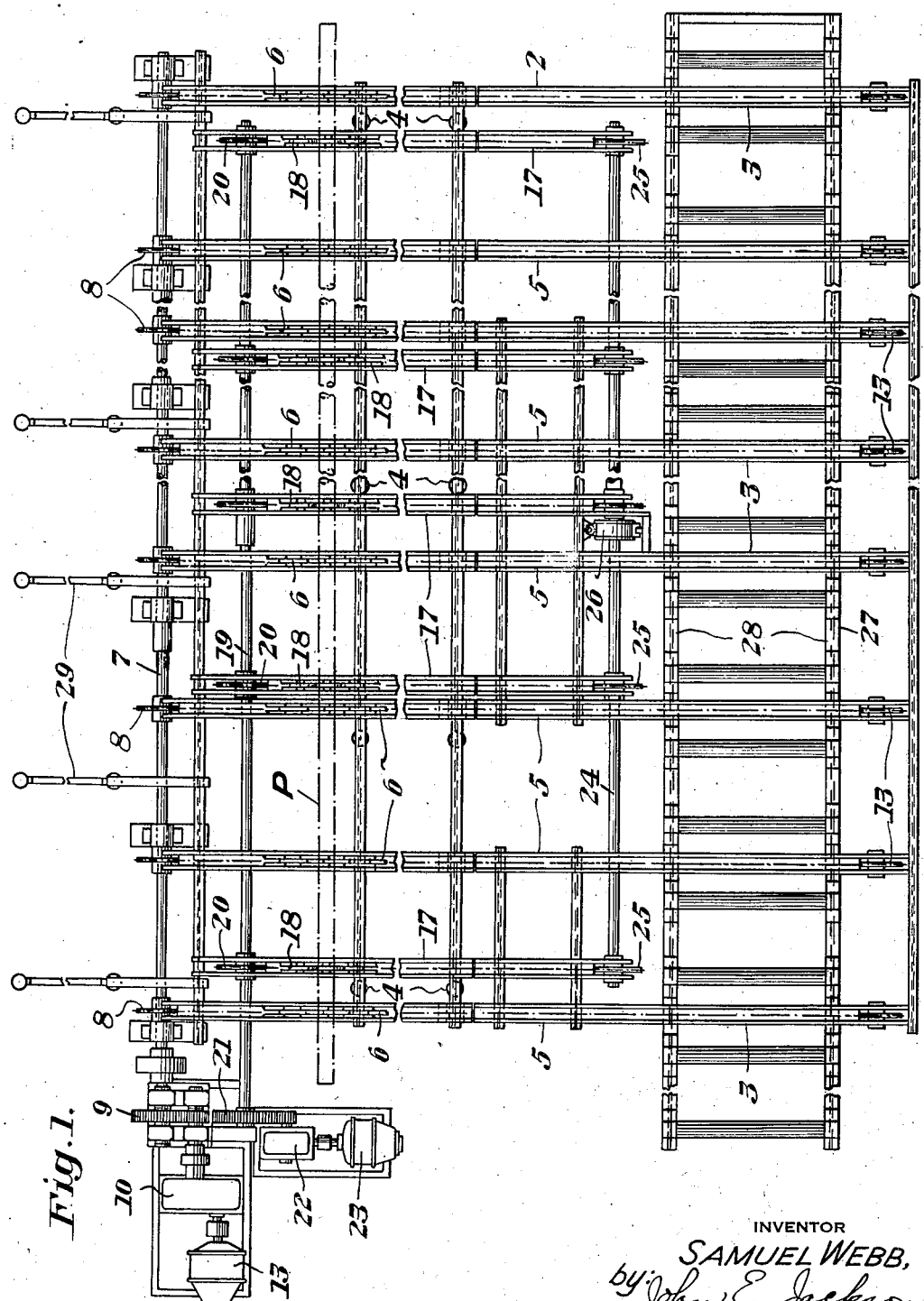

Patented Aug. 22, 1944

2,356,485

UNITED STATES PATENT OFFICE 2,356,485

TUBULAR ARTICLE CONVEYER

Samuel Webb, Pittsburgh, Pa., assignor to National Tube Company, a corporation of New Jersey Application December 30, 1942, Serial No. 470,607

4 Claims. (Cl. 198—161)

This invention relates to conveyers and, particularly, to an improved conveyer for conveying tubular articles, such as pipe and the like.

In heating the ends of pipes and the like for the purpose of upsetting the ends thereof, it is customary to dispose the ends of the pipe to be upset in a furnace and move the pipes therealong by means of a conveyer until the pipe ends have reached the desired temperature. In other words, the ends of the pipe extend into the open front of the furnace and are gradually raised to the proper temperature for upsetting while traveling from one end of the furnace to the other end thereof. For such an upsetting operation, it is essential that the walls at the end of the pipe be heated evenly. An inclined pipe conveying table is usually employed for conveying the pipes through the furnace and it will be readily apparent that a small diameter pipe as it passes thereover will revolve many times more than a larger diameter pipe while passing along the conveyer table and through the furnace. Consequently, while the ends of small pipes may be evenly heated while being conveyed through the furnace by such a conveyer due to the fact that it makes several revolutions while passing therethrough, the ends of a relatively large pipe will not be heated evenly due to the fact that such a pipe will only make one or few revolutions while passing therethrough and such large pipes will not be exposed to the heat of the furnace so as to properly heat the ends of the same. It is desirable, therefore, to provide a means for controlling the rotation of the pipes as they pass through the furnace and it is to such a means that the present invention relates.

Accordingly, it is one of the objects of the present invention to provide an improved conveyer for conveying tubular articles, such as pipe and the like, whereby the rotation of the tubular articles is controlled while being conveyed along and through the furnace.

It is a further object of this invention to provide an improved means for rotating tubular articles as they are conveyed along which may be conveniently incorporated with existing pipe conveyers with a minimum amount of changes and equipment.

It is another object of the invention to provide an improved conveyer for rotating tubular articles along having means arranged therewith for rotating the tubular articles as they are being conveyed therealong which is simple and inexpensive in its construction and, at the same time, efficient and effective in its use.

Various other objects and advantages of this invention will be more apparent in the course of the following specification and will be particularly pointed out in the appended claims.

In the accompanying drawings there is shown, for the purpose of illustration, an embodiment which my invention may assume in practice.

In these drawings:

Figure 1 is a plan view of the improved conveyer of my invention;

Figure 2 is a side elevational view thereof; and

Figure 3 is an enlarged detail view showing the construction and position of the conveyer chains relative to each other.

Referring more particularly to the drawings, the improved conveyer of my invention comprises a frame 2 consisting of a plurality of spaced apart structural members 3 which are supported by a plurality of legs 4. There is arranged on top of the frame a plurality of spaced apart channel members 5 which are slightly inclined and in each of which there is disposed link conveyer chain 6. At one side of the frame 2, there is mounted a longitudinally extending drive shaft 7 having a plurality of spaced apart sprockets 8 securely mounted thereon. The shaft 7 is arranged substantially perpendicular to the conveyer chains 6 and there is arranged on one end thereof, preferably a gear 9 by means of which the shaft is driven in a well known manner through the action of a worm gear reduction unit 10 and a motor 12. On the opposite side of the frame 2 directly opposite and below each of the channel members 5 and the conveyer chains 6, there is mounted an idler sprocket 13. The conveyer chains 6 are disposed around their respective sprockets 8 and 13.

There is also arranged on top of the frame 2, a plurality of spaced apart inclined channel members 17 similar and parallel to the channel members 5 in each of which there is disposed a link conveyer chain 18. At one end of the channel members 17 there is arranged substantially perpendicular thereto, another drive shaft 19 on which there is securely mounted a plurality of spaced apart sprockets 20. On one end of the shaft 19 there is mounted a gear 21 which is adapted to be driven in a well known manner by means of a worm gear reduction unit 22 and a motor 23. At the opposite end of the channel members 17 there is arranged perpendicular thereto, another shaft 24 having a plurality of spaced apart sprockets 25 securely mounted thereon with one disposed opposite each of the channel members 17 and the chains 18 carried thereby. The chains 18 are disposed over and around their respective sprockets 20 and 25. Intermediate the length of the shaft 24, there is arranged, preferably a magnetic brake 26 the purpose of which will hereinafter be described. At one end of the frame 2 there is arranged preferably a table 27 which consists preferably of a plurality spaced apart structural members 28 arranged between the channel members 5.

There is carried preferably by the alternate links of each of the conveyer chains, 18, as shown in Figure 3 of the drawings, an upwardly extending portion 14 having a roller 15 suitably journaled therein. There is preferably disposed at each of the joints in each of the conveyer chains 18, a roller 16 upon which the conveyer chains 18 are adapted to rest and roll as they pass along and through the channel members 17.

The improved conveyer of my invention functions in the following manner. It will be understood that the improved conveyer of the present invention is adaptable for use in connection with a furnace for heating the ends of pipes as they pass along and in order to use the conveyer for such a purpose it is mounted opposite the open end of a suitable heating furnace. The pipes to be heated or the other tubular articles to be conveyed are positioned on the table 27 with the axis thereof extending substantially perpendicular to both of the conveyer chains 6 and 18, and as shown in Figure 2 of the drawings. The pipes P or tubular articles disposed thereon will roll down the structural members 3 due to the inclination thereof and on to the conveyer chains 6 to the upper end of the conveyer chains 18. Upon reaching such a point, it will be seen that the pipes will be disposed upon the chains 6 and lie against the rollers 15 of the upwardly extending portions 14 of the chains 18. It is the purpose of the upwardly extending portions 14 together with the rollers 15 to space the pipes from each other and to permit rotation thereof as the same move along the conveyer. On the other hand, it will be seen that the top surface of the conveyer chains 6 is perfectly flat so as to permit the pipes to roll therealong due to gravity. It is the purpose of the magnetic brake 26 arranged with the shaft 24 to impart a drag to the shaft and to the sprockets 25 carried thereby so that those portions of the chains 18 disposed on the channel members 17 will be maintained taut at all times. It will be understood that the conveyer chains 18 move in one direction to convey the pipes along or from the left to the right, as shown in Figure 2 of the drawings and that the conveyer chains 6 are made to travel in the opposite direction or from the right to the left. It will be seen that the top of the conveyer chains 6 disposed above the top of the links of the chains 18 so that the pipes or tubular articles will rest upon the chains 6 and not upon the links of chains 18, as clearly shown in Figure 3 of the drawings. Thus it will be seen that as the pipes or tubular articles are moved in one direction along the conveyer by means of the conveyer chains 18, they are rotated in the same direction by means of the chains 6 upon which they are disposed. By controlling the speed of the conveyer chains 6 relative to the speed of the conveyer chains 18, it will be seen that the rotation of the pipes or tubular articles may be readily controlled while they are passing along the conveyer. By reversing the direction of the travel of the chains 6 so that both the conveyer chains 6 and the chains 18 travel in the same direction and with the same velocity the pipe can be moved along the table without imparting any rotation thereto if so desired. It will be understood that my improved conveyer may be used as a cooling table and by such arrangement, relative slow forward movement of the pipes can be had without rotation thereof, thus permitting the use of shorter tables in order to conserve floor space and to economize on structural materials and conveyer chains.

At the end of the conveyer or frame 2 opposite that from the table 27, there is arranged preferably a plurality of spaced apart saddle-like members 29 into which the pipes or tubular articles are delivered as they pass from the end of the conveyer.

As the result of my invention, it will be seen that there is provided a conveyer for pipes or other tubular articles whereby the speed of rotation of the pipes or tubular articles may be easily and conveniently controlled as the same are being conveyed therealong.

While I have shown and described one specific embodiment of my invention, it will be understood that this embodiment is merely for the purpose of illustration and description and that various other forms may be devised within the scope of my invention, as defined in the appended claims.

I claim:

1. A conveyer for conveying tubular articles comprising a frame member, a plurality of spaced apart substantially parallel inclined members arranged on said frame member, each of said spaced apart members having a longitudinally extending groove arranged in the upper side thereof, a movable endless chain arranged in each of said grooves with the axes of the tubular articles adapted to be disposed substantially perpendicular to the direction of travel thereof, a plurality of spaced apart upwardly extending members carried by each of said endless chains for spacing the tubular articles from each other, and a plurality of additional spaced apart movable inclined endless chains arranged on said frame members substantially parallel to said first mentioned chains and which are adapted to travel in a direction opposite that from said first mentioned endless chains and upon which the tubular articles are adapted to rest and roll therealong due to gravity, said last mentioned endless chains adapted to rotate the tubular articles at a predetermined rate while the same roll therealong.

2. A conveyer for conveying tubular articles, as defined in claim 1, wherein the plurality of spaced apart upwardly extending members carried by each of the first mentioned endless chains for spacing the tubular articles from each other consists of a plurality of arm-like members with each having a roller mounted in the upper end thereof against which the tubular articles are adapted to lie as they roll along the last mentioned chains.

3. Apparatus for conveying tubular articles including a plurality of spaced apart movable inclined endless chains upon which the tubular articles are adapted to be disposed with the axes of the same substantially perpendicular to the direction of travel thereof, said tubular articles adapted to roll along said chains due to gravity, a plurality of additional endless chains arranged substantially parallel to said first mentioned endless chains which are adapted to travel in the direction opposite that from said first mentioned endless chains, and means carried by each of said last mentioned chains for spacing the tubular articles from each other as they roll along said first mentioned chains, said first mentioned endless chains adapted to rotate the tubular articles at a predetermined rate while the same roll therealong.

4. Apparatus for conveying tubular articles including a plurality of spaced apart movable inclined endless chains upon which the tubular articles are adapted to be disposed with the axes of the same substantially perpendicular to the direction of travel thereof, said tubular articles adapted to roll along said chains due to gravity, and a plurality of additional spaced apart movable endless chains with each positioned alternately relative to said first mentioned chains, each of said last mentioned chains having a plurality of upwardly extending spaced apart members carried thereby for holding the tubular articles in spaced relation relative to each other while they roll along said first mentioned chains, said first mentioned chains adapted to travel in a direction opposite the movement of the tubular articles adapted to be disposed thereon whereby the tubular articles are rotated during the movement thereof along the chains with said last mentioned chains adapted to travel in the same direction as the direction of movement of said tubular articles, the speed of both sets of said endless chains adapted to be controlled relative to each other so that the tubular articles will be rotated at a predetermined rate during the rolling movement thereof along said first mentioned chains.

SAMUEL WEBB.